INVENTOR.
Jerome C. Salmons
BY
ATTORNEY

April 7, 1959 — J. C. SALMONS — 2,880,851
BELT CONVEYOR
Filed July 11, 1955 — 3 Sheets-Sheet 3
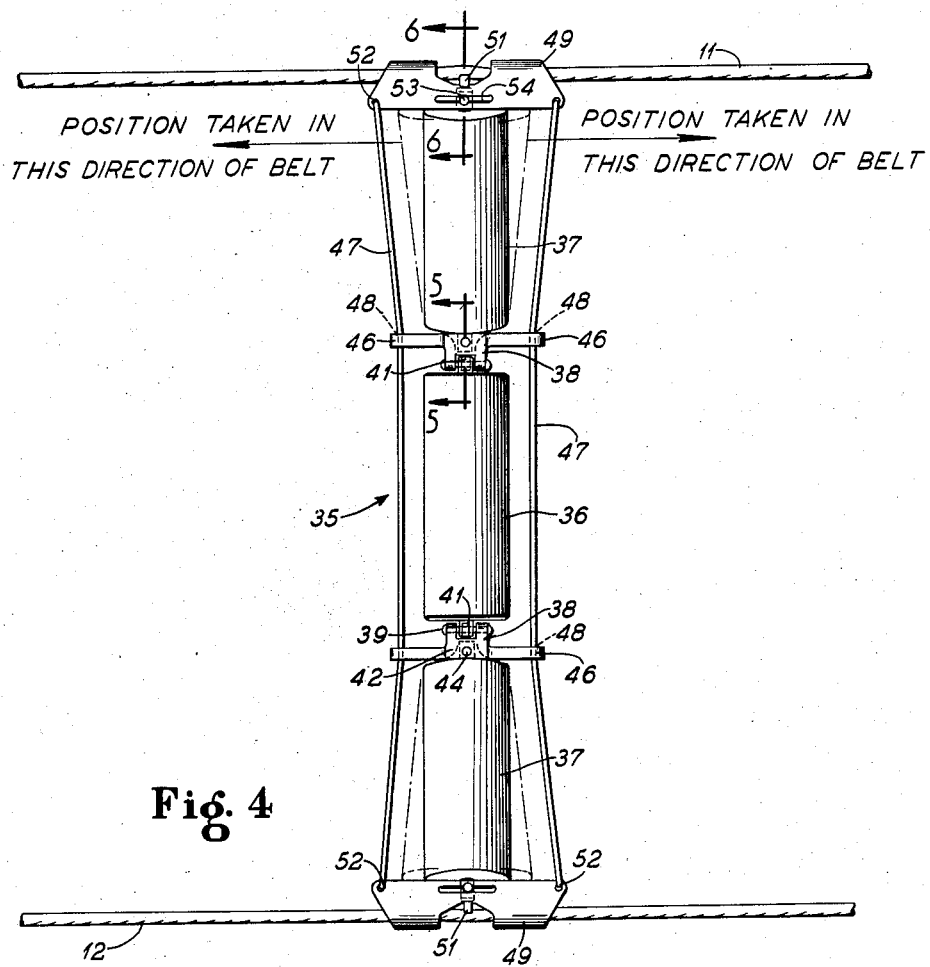
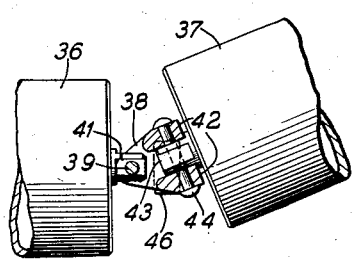
Fig. 5
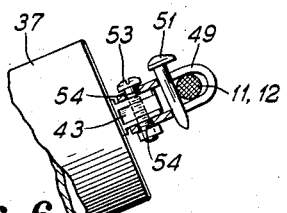
Fig. 6
INVENTOR.
Jerome C. Salmons
BY
Murray G. Gleeson
ATTORNEY

United States Patent Office 2,880,851
Patented Apr. 7, 1959

2,880,851

BELT CONVEYOR

Jerome C. Salmons, Chicago, Ill., assignor to Goodman Manufacturing Company, Chicago, Ill., a corporation of Illinois Application July 11, 1955, Serial No. 521,075

9 Claims. (Cl. 198—192)

This invention relates generally to belt conveyors, and more particularly to an improved troughing roller assembly therefor adapted to improve the training of the load conveying reach of such conveyor.

The invention is particularly applicable to conveyor idler assemblies of the type which are suspended catenary-like between laterally spaced flexible strands which serve as longitudinal conveyor frame members.

It has been known that the training of the conveying reach of a belt conveyor can be improved by swinging the outer end of the axis of the troughing rollers in the direction of belt movement. Articulated troughing roller assemblies for belt conveyors utilizing laterally spaced flexible strands as longitudinal frame members readily accommodate themselves to varying loads on the conveyor, but tend to swing in the direction of belt movement, said swinging taking place about the points of attachment of the assemblies to the flexible strands. The troughing rollers in such movement shift the inner end of their axes in the direction of belt movement. Such shifting materially reduces the proper training of the belt.

With the foregoing considerations in mind it is a principal object of the invention to provide a troughing roller assembly which will at all times have its troughing rollers properly oriented to insure proper tracking of the conveying reach.

Another object is to provide an articulated troughing roller assembly which will shift its troughing rollers in a direction to insure proper tracking of the conveying reach irrespective of the direction of movement thereof.

Other objects and important features of the invention will be apparent from a study of the specification following taken with the drawings which together describe and illustrate a number of preferred embodiments of the invention, and what are now considered to be the best mode of practicing the principles thereof. Other embodiments of the invention may become apparent to those having the benefit of the teachings herein, and it is therefore intended that the scope of the invention not be limited by the precise embodiments herein shown, such other embodiments being intended to be reserved especially as they fall within the scope of the appended claims.

In the drawings:

Fig. 4 is a plan view of a troughing roller assembly embodying another form of the invention herein;

Fig. 5 is a sectional view to an enlarged scale, certain parts being shown in elevation, showing the connection between the bottom load supporting roller and an inclined troughing roller, said view being taken substantially along the line 5—5 of Fig. 4, looking in the direction of the arrows;

Fig. 6 is a sectional view, certain parts being shown in elevation, showing the connection of the inclined troughing roller to the supporting flexible strand, said view being taken substantially along the line 6—6 of Fig. 4 looking in the direction of the arrows;

Figure 1:
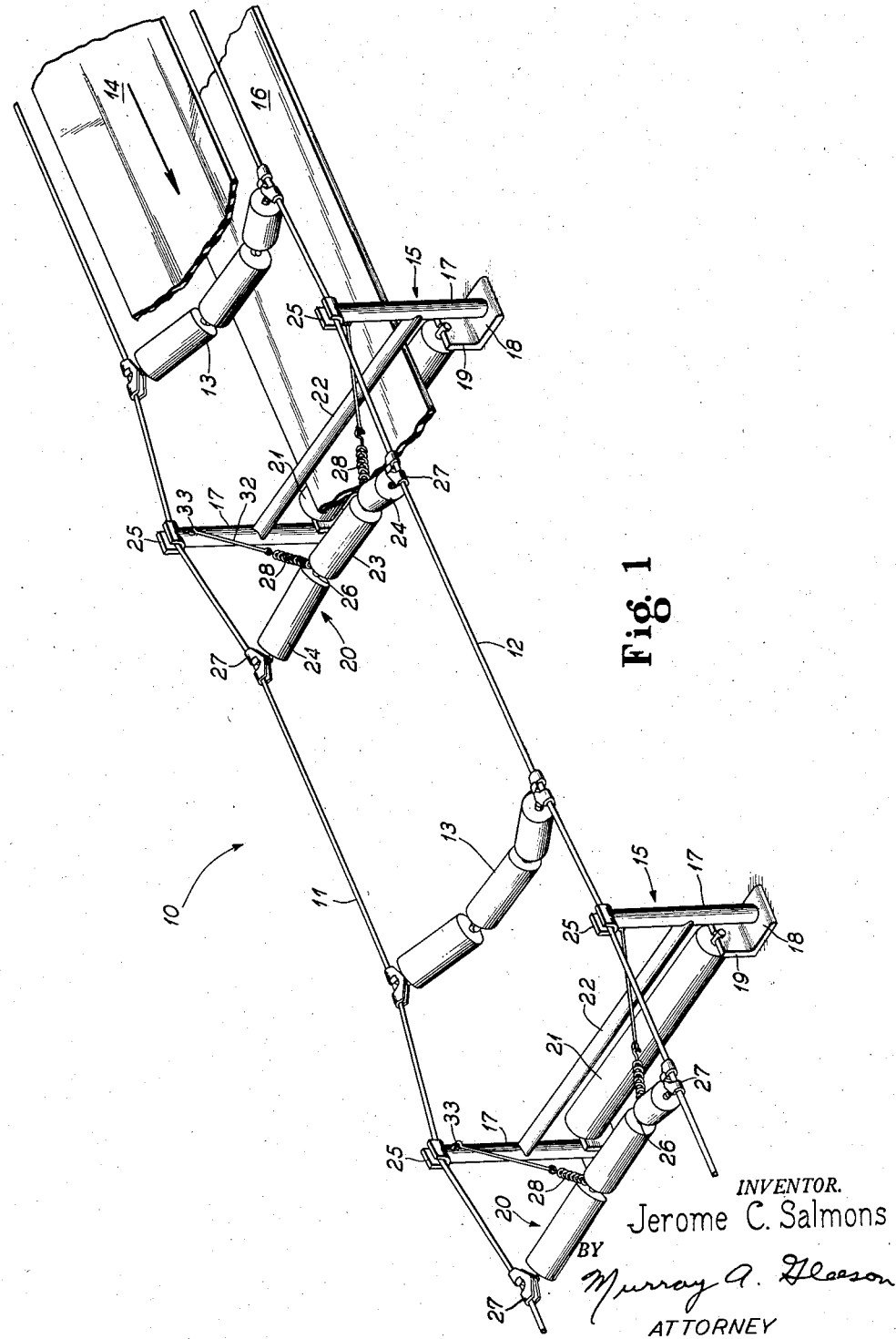
Fig. 1 is a perspective view of a belt conveyor of the type utilizing laterally spaced flexible strands as longitudinal frame members, said conveyor having embodied therein the improvements according to the present invention.

Referring now particularly to Fig. 1 of the drawings, there is shown a belt conveyor indicated generally by the reference numeral 10. Said conveyor is of the type which includes a pair of laterally spaced flexible strands 11 and 12 which are supported at intervals throughout their length upon standards indicated generally by the reference numeral 15. The spaced flexible strands 11 and 12 support troughing roller assemblies indicated generally by the reference numeral 13, some of the troughing roller assemblies being referred to by the reference numeral 20 and embodying therein one form of the improvement according to the present invention. The troughing roller assemblies 13 and 20 support the conveying reach of a conveyor belt 14, and maintain same in proper troughing contour.

Each of the standards 15 includes laterally spaced vertical posts 17 which rest upon angle feet 18, an upturned leg 19 of the angle 18 supporting a return or idler roller 21 for a return reach 16. The posts 17 are maintained in a proper spaced apart relationship by means of a transversely extending member 22, and each post 17 has a saddle 25 in the top thereof to guide and support the strands 11 or 12.

Figure 2:
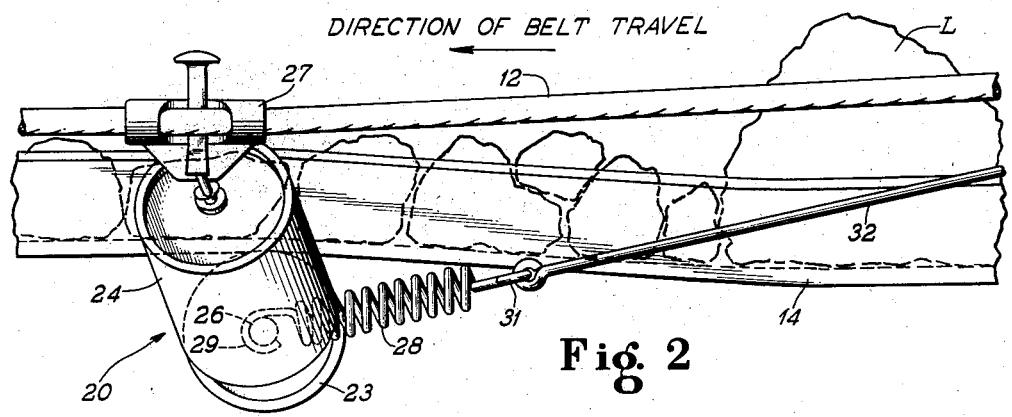
Fig. 2 is a side view of one of the troughing roller assemblies according to the present invention, and as shown in the belt conveyor of Fig. 1, said troughing roller assembly being in a position at some distance from a concentrated load being carried by the conveying reach.
Figure 3:
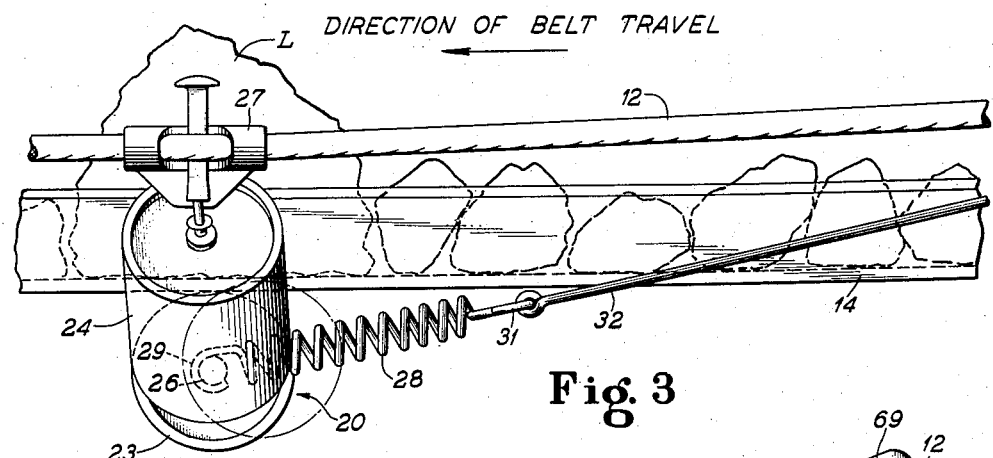
Fig. 3 is a view similar to Fig. 2, but showing the position taken by the troughing roller assembly when a concentrated load is passing over the troughing roller assembly.

Referring now to Figs. 2 and 3 of the drawings, the troughing roller assembly 20 includes a bottom or load supporting roller 23 which is flanked at each end by inclined troughing rollers 24. The bottom load supporting roller 23 is articulately connected at each end to the inclined troughing rollers 24 by any convenient form of articulated connection 26, and the precise form of such articulating connection may be as that shown in an application of McCann et al., Serial No. 521,355, filed July 11, 1955, for Improvements in Rope Frame Conveyor and Troughing Roller Assembly Therefor, or in an application of Roy Lo Presti, Serial No. 523,454, filed July 21, 1955 for Improvements in Troughing Rollers for Belt Conveyors, both now abandoned.

Each of the troughing rollers 24 is articulately suspended from a bracket 27 connected to the flexible strand 11 or 12. Such bracket may be of the form as disclosed in the aforementioned Lo Presti and McCann et al. applications.

In order to assure proper tracking of the conveying reach 14, the inclined troughing rollers 24 should have their extreme ends displaced in a direction corresponding to the direction of belt travel. Such displacement of the troughing rollers creates a component of force tending to center the conveying reach.

However, troughing roller assemblies of the articulated type tend to swing about their points of articulation at their support brackets in a direction corresponding to the direction of belt travel. Such swinging of the assembly disturbs the geometrical relationship described in the previous paragraph, and the troughing rollers instead of having their extreme ends pointing in the direction of belt travel have their extreme ends pointing in a direction opposed to the direction of belt travel.

Such is particularly the case when a concentrated load is passing over the articulating troughing roller assembly. Obviously it is desirable to maintain the aforementioned canted position of the troughing roller to insure such proper alignment of the conveying reach, and it is also eminently desirable that the troughing roller assembly be enabled to deform or change its position in accordance with the passage over such assembly of the concentrated load.

It is to the accomplishment of both of these functions that the structure described with Figs. 1, 2 and 3 is particularly adapted.

Referring now to Figs. 2 and 3 of the drawings, there is shown one of the inclined troughing rollers and the bottom load supporting roller in a position during normal or light loading of the belt whereby the troughing rollers are inclined and canted in the aforementioned desired position. In order to maintain such desirable position the points of articulation of the load supporting roller 23 to the troughing roller 24 have connected thereto a spring 28 having a loop 29 thereof connected to the aforesaid point of articulation 26 and having the other end 31 thereof connected to a tie link 32. Said tie link 32 is connected pivotally at 33 to the post 17 of the nearest support standard as seen in Fig. 1.

In Fig. 2 there is shown a concentrated load L which is moving with the conveying reach 14 toward the troughing roller assembly 20. In Fig. 3 the concentrated load L is shown at the troughing roller assembly 20. Normally the presence of such concentrated or even lighter loads on the conveying reach 14 would tend to cause the entire troughing roller assemblies 20 to shift in a direction "downstream" except for the provision of the spring 28 and tie link which restricts such movement to a desired degree. The provision of the spring 28 and tie link 32 enables the entire assembly to be depressed in a vertical direction with only a limited amount of such "downstream" shift.

After the load has moved beyond the troughing roller assembly 20 it may once more assume the position in Fig. 2 with the desired canting of the troughing roller 24.

It will thus be apparent that even during the occurrence of a concentrated load L at the troughing roller assembly no position is taken by the troughing rollers 24 which would cause their outer ends to be moved in a direction corresponding to the direction of movement of the conveying reach, thereby preventing misalignment of said conveying reach.

Referring now to Figs. 4, 5 and 6 of the drawings, there is shown a troughing roller assembly wherein the inclined troughing rollers take the proper position with their axes canted in the proper direction to train the belt irrespective of the direction of movement of the conveying reach.

Such an assembly is referred to generally by the reference numeral 35 and includes a bottom or load supporting roller 36 flanked by inclined troughing rollers 37. The bottom load supporting roller 36 is connected articulately to its adjacent inclined troughing roller 37, and such a connection includes a clevis 38 and a pin 39 passing through a shaft 41 extending from the end of the load supporting roller 36. The clevis 38 also has a pair of clevis jaws 42 which extend in directions opposite to the clevis 38 and normal to the jaws of the clevis 38, troughing roller 37 having a shaft 43 connected to the clevis 42 by means of a pin 44.

Each of the clevises has a pair of arms 46 extending in directions perpendicular to the axis of the load supporting roller 36, and a cable 47 is threaded through openings 48 near the end of each arm 46. A bracket 49 having a U-shaped cross-section as seen in Fig. 6 is anchored to the cable 11 or 12 by means of a locking pin 51. Each end of the cable 47 is anchored as at 52 to the end of the bracket 49.

The outer ends of the troughing rollers 37 are arranged to shift their axes in the direction of movement of the conveying reach, and to this end the outer end of the shaft 43 of troughing roller 37 is provided with a pin 53 which is freely movable in a slot 54 formed in the limbs of the U-shaped bracket 49.

It will be seen that the articulated connections between the load supporting rollers and the inclined troughing rollers and the pin and slot connection between the troughing rollers and the brackets 49 are relieved of tension by the cables 47, 47 connected to the brackets 49.

The outer ends of the troughing rollers 37, 37 are thus unrestrained, since the load thereon is transmitted to the flexible strands 11 and 12 of the cables 47, 47 connected to the brackets 49. The outer ends of the troughing rollers 37, being thus unrestrained, can shift with respect to the bracket 49 by the provision of the pin 53 which is freely movable in the slot 54.

The spacing of the cables 47, and their spaced connections to the brackets 49 prevent the swinging "downstream" of the troughing roller assembly 35, the rigidity of the cables 11 and 12 and the width of contact of the brackets 49 preventing such swinging movement. At the same time, the articulated connections between the load supporting rollers 36 and the troughing rollers 37 enables the assembly to deform in a downward direction as may be occasioned by a concentrated load at such troughing roller assembly. It will also be noted that the troughing rollers 37 may shift their outer ends in the direction of movement of the conveying reach, so as to insure proper training of the belt in response to movement of the belt in either direction at all times.

Figure 7:
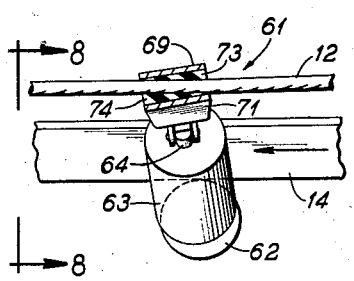
Fig. 7 is a side elevation view of a troughing roller assembly embodying another form of the invention.
Figure 8:
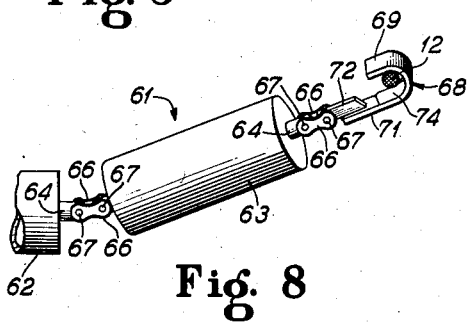
Fig. 8 is an elevation view of a portion of the assembly seen in Fig. 7, said view being in the direction of the arrows 8—8 of Fig. 7.

Referring now to Figs. 7 and 8 of the drawings there is shown still another embodiment referred to generally by the reference numeral 61 which denotes a troughing roller assembly spanning the distance between flexible strands 11 and 12. The assembly includes a load supporting roller 62 which is flanked by inclined troughing rollers 63.

Each of the rollers is mounted to turn on a shaft 64, and the contiguous ends of the shafts 64 are articulately connected by links 66 which flank the shafts 64, each end of the link 66 being pivotally connected to the shaft 64 by a pin 67.

The troughing rollers 63 are also articulately connected to a hanger or bracket 68 supported on the strand 11 or 12. Bracket 68 is U-shaped in cross-section and has an upper limb 69 and a lower limb 71 underlying the same.

The lower limb 71 extends inward in the manner shown and affords a place of connection for a short strap 72 which is articulately conected by links 66 and pins 67 to the inclined roller 63, in the same manner as the rollers 62 ad 63 are connected to each other.

It will be observed that the roller assembly is essentially rigid in directions corresponding to the axis of the conveying reach, but the rollers may move with respect to each other about essentially horizontal axes.

Means are provided to maintain the assembly thus far described in a position so that the inclined troughing rollers 63 will have their outermost ends tilted in the direction of movement of the conveying reach so as to improve the training of such reach. To this end the entire assembly is tilted or canted in the manner shown by wedges 73 and 74.

These wedges are preferably made of a suitable elastomer and are preferably bonded to the bracket 68. As seen, wedge 73 may be thus welded to the undersurface of the upper limb 69 thereof, and wedge 74 to the upper surface of the lower limb 71 thereof, the wedges engaging the strands 11 and 12 and maintaining the troughing roller assembly 61 in the tilted position shown.

It will be observed that the assemblies 61 may be reversed end for end in accordance with the direction of the conveying reach.

While the invention has been described in terms of a number of preferred embodiments thereof its scope is intended to be limited only by the claims here appended.

I claim as my invention:

1. In a belt conveyor utilizing a pair of spaced flexible strands as longitudinal frame members: a freely articulated roller assembly conected pendently between said strands to support the conveying reach of an endless belt and to articulate freely in a vertical plane in accordance with the changing loads on said conveying reach, said assembly having at least one pair of wing rollers; and means to maintain the inner ends of said wing rollers in an "upstream" direction relative to their outer ends.

2. In a belt conveyor which utilizes a pair of spaced flexible strands as longitudinal frame members: at least one assembly of freely articulately interconnected rollers suspended between and attached to said spaced strands to support the conveying reach of an endless belt and to articulate freely in a vertical plane in accordance with the changing loads on said conveying reach; and means for maintaining the inner ends of a pair of said rollers on opposite sides of the center of the belt in an upstream direction relative to their outer ends.

3. In a belt conveyor of the type having a pair of laterally spaced flexible strands, a troughing roller assembly extending between said spaced strands and supporting the conveying reach of said belt conveyor, said troughing roller assembly comprising rollers freely articulately interconnected, connections between the outer of said rollers and their corresponding flexible strands, and means acting between said roller assembly and said flexible strands for maintaining the inner ends of said rollers displaced in an "upstream" direction relative to their outer ends.

4. In a belt conveyor, a pair of laterally spaced flexible strands, troughing roller assemblies extending between said spaced strands and supporting the conveying reach of said belt conveyor, at least one of such troughing roller assemblies comprising a load supporting roller, troughing rollers flanking said load supporting roller including means for freely articulately connecting said troughing rollers to said load supporting roller, a bracket supported by each of said flexible strands, a free articulating connection between the outer end of a troughing roller and a corresponding bracket, and means for maintaining the inner ends of said troughing rollers in an "upstream" direction relative to their outer ends.

5. In a belt conveyor, a pair of laterally spaced flexible strands, troughing roller assemblies extending between said spaced strands and supporting the conveying reach of said belt conveyor, at least some of such troughing roller assemblies comprising a load supporting roller, troughing rollers flanking said load supporting roller including means for freely articulately connecting said troughing rollers to said load supporting roller, a bracket secured to each of said flexible strands, and a freely articulated connection between the outer end of a troughing roller and its corresponding flexible strand, said troughing rollers being so connected to said load supporting roller and said brackets as to have their extreme ends shifted in the direction of movement of said conveying reach, and resilient means for limiting the "downstream" shifting of said troughing assembly.

6. In a belt conveyor, a pair of laterally spaced flexible strands, troughing roller assemblies extending between said spaced strands and supporting the conveying reach of said belt conveyor, at least some of such troughing roller assemblies comprising a load supporting roller, troughing rollers flanking said load supporting roller including means for freely articulately connecting said troughing rollers to said load supporting roller, a bracket secured to each of said flexible strands, and a freely articulated connection between the outer end of a troughing roller and its corresponding flexible strand, and means for limiting the "downstream" shifting of said assembly when the conveying reach is loaded.

7. In a belt conveyor which utilizes a pair of spaced flexible strands as longitudinal frame members: at least one assembly of freely articulately interconnected rollers suspended between and attached to said spaced strands to support the conveying reach of an endless belt; and means for maintaining the inner ends of a pair of said rollers on opposite sides of the center of the belt in an upstream direction relative to their outer ends.

8. In a belt conveyor, a pair of laterally spaced flexible strands, troughing roller assemblies extending between said spaced strands and supporting the conveying reach of said belt conveyor, at least some of such troughing roller assemblies comprising a load supporting roller, troughing rollers flanking said load supporting roller including means for freely articulately connecting said troughing rollers to said load supporting roller, a free articulated connection between the outer end of a troughing roller and its corresponding flexible strand, said troughing rollers being so connected to said load supporting rollers as to have their extreme ends shifted in the direction of movement of said conveying reach, and resilient means for limiting the downstream shifting of said troughing roller assembly.

9. In a belt conveyor, a pair of laterally spaced flexible strands, troughing roller assemblies extending between said spaced strands and supporting the conveying reach of said belt conveyor, at least some of such troughing roller assemblies comprising a load supporting roller, troughing rollers flanking said load supporting roller including means for freely articulately connecting said troughing rollers to said load supporting roller, and a free articulated connection between the outer end of a troughing roller and its corresponding flexible strand, and means for limiting the "downstream" shifting of said assembly when the conveying reach is loaded.

References Cited in the file of this patent

UNITED STATES PATENTS

| 1,633,153 | Wray | June 21, 1927 |
| 1,748,301 | McKinlay | Feb. 25, 1930 |
| 2,261,088 | Kendall | Oct. 28, 1941 |